No. 818,356. PATENTED APR. 17, 1906.
T. A. DAVIS.
PLANT IRRIGATION SYSTEM.
APPLICATION FILED SEPT. 21, 1905.

UNITED STATES PATENT OFFICE.

THOMAS ALBERT DAVIS, OF FINDLAY, ILLINOIS, ASSIGNOR OF ONE-HALF TO CHARLES BEVARLEY DAVIS, OF TODDS POINT TOWNSHIP, ILLINOIS.

PLANT-IRRIGATION SYSTEM.

No. 818,356.     Specification of Letters Patent.     Patented April 17, 1906.

Application filed September 21, 1905. Serial No. 279,557.

*To all whom it may concern:*

Be it known that I, THOMAS ALBERT DAVIS, a citizen of the United States, residing at Findlay, in the county of Shelby and State of Illinois, have invented a new and useful Plant-Irrigation System, of which the following is a specification.

My invention relates to improvements in irrigating systems for the irrigation of potted plants; and the objects of my invention are, first, to provide a system wholly suited for the irrigation of potted plants; second, to provide means whereby the evaporation of the water is lessened; third, to afford facilities for fertilizing the plants in connection with the irrigation thereof. I attain these objects by the mechanism illustrated in the accompanying drawings, in which—

Figure 1:
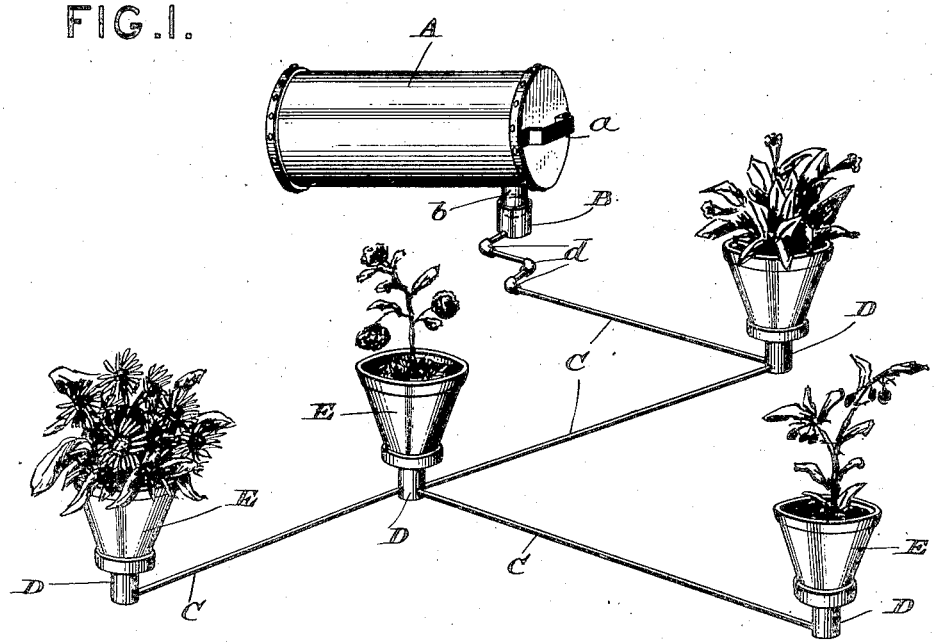
Figure 2:
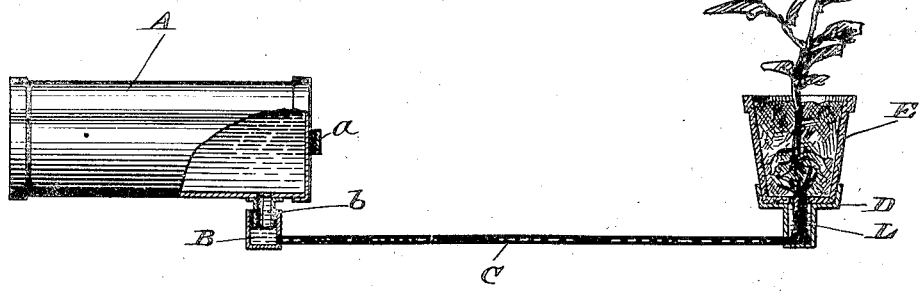

Figure 1 shows the system with several potted plants connected. Fig. 2 shows reservoir as connected with a pot-receptacle, parts of the same being broken away.

Similar letters refer to similar parts throughout the several views.

The reservoir A is provided with but one opening and that the necked-shaped outlet $b$, at which place the said reservoir is filled. When the said reservoir is inverted, so that the said outlet $b$ is inserted into the receiving-cup B, the water in said reservoir will flow out into the said receiving-cup B until it reaches the base of the outlet $b$. Connections are made from the said receiving-cup to the pot-receptacles by means of the lead pipe C, which is provided with the elbow-unions $d\ d$, so that the reservoir may be raised or lowered so as to regulate the amount of water that is allowed to flow into the said pot-receptacles. The said pot-receptacle D that I have previously mentioned is a hollow cup with a flanged top for the receiving of the flower-pot. Said pot-receptacle is also provided with the wick L, which is intended to be drawn through the opening in the base of the flower-pot E and by means of capillary attraction carries the water up to the use of the plant. Said pot-receptacle is constructed so that the flanged top fits closely around the base of the flower-pot, thereby preventing evaporation. As the water is used by the plant it naturally reduces the amount in the receiving-cup B until the same is lowered below the base of the outlet $b$, when the action of gravity will immediately renew the supply until the flow is stopped, as has been hereinbefore mentioned.

If the system is used for household plants, it is intended that the pot-receptacles be fitted in openings on the table, the flanged tops only appearing above the surface, so that the lead pipes can pass on the under side of the table and be out of sight, and when the system is used for out-of-door plants, such as in cemeteries, it is intended to bury the lead pipe under ground, leaving only the flanged top of the pot-receptacles exposed.

I am aware that prior to my invention reservoirs have been in use which act upon the same principle as the one herein specified. Therefore I do not claim such a combination broadly; but What I do claim as my invention, and desire to secure by my Letters Patent, is—

The herein-described plant-irrigating system consisting of the reservoir A with the neck-shaped outlet $b$, together with the receiving-cup B, the lead pipe C with the elbow-unions $d\ d$ and the pot-receptacle D, and the wick L all substantially as set forth and for the purpose specified.

In testimony whereof I have signed my name to this specification in the presence of two witnesses.

THOMAS ALBERT DAVIS.

Witnesses:
     F. P. AULD,
     BRAY D. TRELL.